United States Patent
Hu

(10) Patent No.: US 8,199,707 B2
(45) Date of Patent: Jun. 12, 2012

(54) INTER-CELL DISCOVERY AND COMMUNICATION USING TIME DIVISION MULTIPLE ACCESS COEXISTENCE BEACONING PROTOCOL

(75) Inventor: Wendong Hu, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 1069 days.

(21) Appl. No.: 12/118,563

(22) Filed: May 9, 2008

(65) Prior Publication Data

US 2008/0285525 A1  Nov. 20, 2008

Related U.S. Application Data

(60) Provisional application No. 60/970,731, filed on Sep. 7, 2007, provisional application No. 60/917,841, filed on May 14, 2007, provisional application No. 60/917,533, filed on May 11, 2007.

(51) Int. Cl.
*H04W 72/00* (2009.01)
*H04W 72/04* (2009.01)
*H04W 74/04* (2009.01)
*H04W 28/26* (2009.01)

(52) U.S. Cl. .................. 370/329; 370/348; 455/450

(58) Field of Classification Search ................ 370/337, 370/338, 328, 329, 345, 347, 348; 455/450, 455/451, 452.1
See application file for complete search history.

(56) References Cited

U.S. PATENT DOCUMENTS

| | | | | |
|---|---|---|---|---|
| 7,756,058 B2 * | 7/2010 | Cordeiro et al. | ............. | 370/252 |
| 2007/0223419 A1 * | 9/2007 | Ji et al. | ............. | 370/329 |
| 2007/0249341 A1 * | 10/2007 | Chu et al. | ............. | 455/434 |
| 2007/0280163 A1 * | 12/2007 | Zhang | ............. | 370/331 |
| 2008/0159258 A1 * | 7/2008 | Ji et al. | ............. | 370/350 |
| 2008/0253341 A1 * | 10/2008 | Cordeiro et al. | ............. | 370/338 |
| 2008/0253347 A1 * | 10/2008 | Cordeiro et al. | ............. | 370/343 |

FOREIGN PATENT DOCUMENTS
WO  WO 2007031960 A2 *  3/2007

* cited by examiner

*Primary Examiner* — Chi Pham
*Assistant Examiner* — Ahmed Elallam
(74) *Attorney, Agent, or Firm* — Hogan Lovells US LLP

(57) ABSTRACT

A self-coexistence window reservation protocol for a plurality of Wireless Regional Area Network (WRAN) cells operating in a WRAN over a plurality of channels includes a sequence of self-coexistence windows that uniquely identifies a transmission period for each WRAN cell. A self-coexistence window reservation protocol is included within the first packet of a Coexistence Beaconing Protocol period identifying when each WRAN cell associated with a particular channel will transmit. When not actively transmitting, a WRAN cells remains in a passive, receiving mode to accept data. As the transmissions of each WRAN cell operating on a particular channel are scheduled, contention for a transmission period is eliminated.

16 Claims, 4 Drawing Sheets

INTER-CELL DISCOVERY AND COMMUNICATION USING TIME DIVISION MULTIPLE ACCESS COEXISTENCE BEACONING PROTOCOL

RELATED APPLICATION

This application claims the benefit of U.S. Provisional Patent Applications Nos. 60/917,533, filed on May 11, 2007, 60/917,841, filed on May 14, 2007, and 60/970,731 filed Sep. 7, 2007, these applications are hereby incorporated by reference for all purposes as if fully set forth herein.

BACKGROUND OF THE INVENTION

1. Field of the Invention

Embodiments of the present invention relate, in general, to inter-cell communications in a wireless regional area network and particularly to using Time Division Multiple Access ("TMDA") Coexistence Beaconing Protocol for inter-cell discovery and communications.

2. Relevant Background

Cells of a Wireless Regional Area Network ("WRAN") overlap to form a seamless communication environment in which users operating consumer premise pieces of equipment ("CPE") can travel from one cell to another without loss of connectivity. While simple in concept, the reality of making such an overlapping system of cells operate efficiently is very complex. Many techniques to manage simultaneous communication have been used including Time Division Multiple Access (TDMA).

TDMA is a scheme that subdivides the available frequency band into one or more channels. These channels are further divided into a number of physical channels called frames. Using TDMA, overlapping WRAN cells can operate on one or more channels while allowing CPEs to communicate simultaneously. CPEs communicate with each other, and to some extent, with a base station, via packets sent via a frame. To the extent that two WRAN cells operate on the same channel, CPEs can communicate using Coexistance Beaconing Protocol ("CBP") packets in which their self-coexistence window ("SCW") is synchronized.

FIG. 1 shows a typical frame sequence of two WRAN cells operating on the same channel as is known in the prior art. As shown, WRAN cell number 1 (WRAN1) 110 and WRAN cell number 2 (WRAN2) both operate on channel A. The channel is divided into a number of frames and each frame includes a plurality of SCWs that convey what a particular WRAN cell is doing at any point of time and data. These frames are known in the art as packets. During an active mode 130, 140 a cell is transmitting its data. This is shown in FIG. 1 by the three 11 is with respect to WRAN1 and three 222s with respect to WRAN2. As shown, WRAN1 is transmitting during an active mode in the first frame and WRAN2 is in a passive or receiving mode 150. Similarly, in the second frame WRAN2 is in an active mode 140 and WRAN1 is in a passive mode 160. However this sort of configuration (one in which one WRAN is transmitting and the other is receiving) is not always guaranteed.

The third frame of FIG. 1 shows a condition where both WRAN1 110 and WRAN2 120 are transmitting at the same time 170. A collision occurs and no data is transferred. Similarly, situations can exist where the WRANs are both in passive mode 180 again resulting in no transfer of data. The current state of the art for communication of CBP packets using synchronized SCWs is, as is known in the art, best effort or contention based communication. Each WRAN continues to try to transmit randomly until a non-collision event occurs that allows the transmission to succeed. As one skilled in the art will recognize, such an approach is inefficient.

As one would expect, the problems identified above are compounded when multiple channels are considered. As will be appreciated by one skilled in the art, when multiple channels are used, a WRAN cell can only transmit on one channel but can receive on several. FIG. 2 shows a typical frame sequence of two WRAN cells operating on different channels using CBP as is known in the prior art. As before, WRAN1 210 is operating on channel A; however, this time WRAN2 220 is operating on channel B. Thus, for information to be conveyed, not only must a collision not exist but both WRANs must be operating on the same channel. Thus, while in the first frame 230 WRAN1 210 is active and transmitting on channel A and WRAN2 220 is operating in a passive mode, no captures occurs since WRAN2 is listening on channel B. Likewise, in frame 240 WRAN2 220 is transmitting on channel B but a capture of data is again wanting as WRAN1 210 is listening on channel A. Indeed several frames may pass until the two WRAN cells are operating in a combination that permits data transfer.

As the best effort process of cross-channel CBP communication continues, several frames pass with both WRAN cells operating in a passive mode. Eventually, WRAN1 210 will transmit 250 on channel A and WRAN2 will be listening on channel A enabling a capture. Likewise, when WRAN2 transmits on channel B 260 and WRAN1 is listening on channel B another capture will occur. Communication between two neighboring cells can succeed only when at least two CBP-enabled stations from different cells are tuned to the same channel during a SCW with one of them transmitting and the other receiving.

As with a single channel CBP process, cross channel communication is contention based. A challenge exists to coordinate multiple channel communication between CBP-enabled stations of differing neighboring cells.

SUMMARY OF THE INVENTION

A SCW reservation protocol for a plurality of WRAN cells operating in a WRAN over a plurality of channels includes, according to one embodiment of the present invention, a sequence of SCWs that uniquely identifies a transmission period for each WRAN cell. According to one embodiment of the present invention a plurality of packets, bounded by frame boundaries, each include a SCW. A reservation protocol is included within the first packet of a SCW reservation period, also referred to herein as a CBP frame, that identifies when each WRAN cell associated with a particular channel will transmit. When not actively transmitting, a WRAN cells remains in passive, receiving mode to accept data. As the transmissions of each WRAN cell operating on a particular channel are scheduled, contention for a transmission period is eliminated.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

According to another embodiment of the present invention, an announcement SCW is included in the initial packet of a plurality of frames. The announcement SCW, also known as a hosting SCW, schedules presentation or transmission periods of each WRAN cell operating on a particular channel. When WRAN cells overlap and co-exist on two or more channels, the hosting SCW for each CBP frame is offset such that the hosting SCW transmission of each channel is received by each other WRAN cell.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

Figure 1:
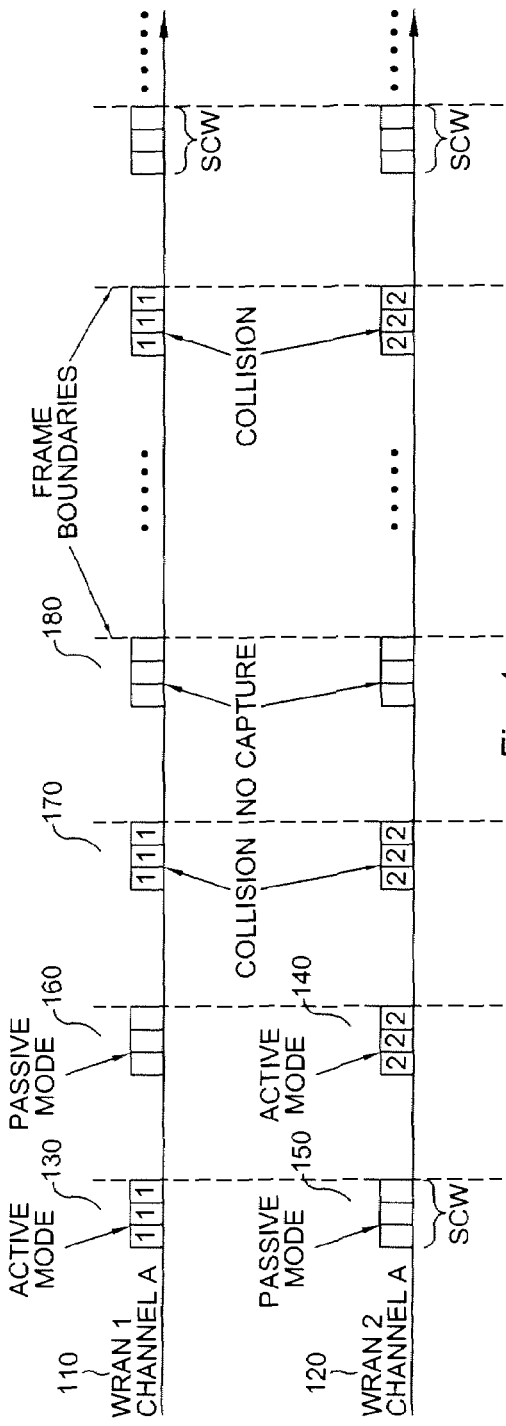
FIG. 1 shows a typical frame sequence of two WRAN cells operating on the same channel as is known in the prior art.
Figure 2:
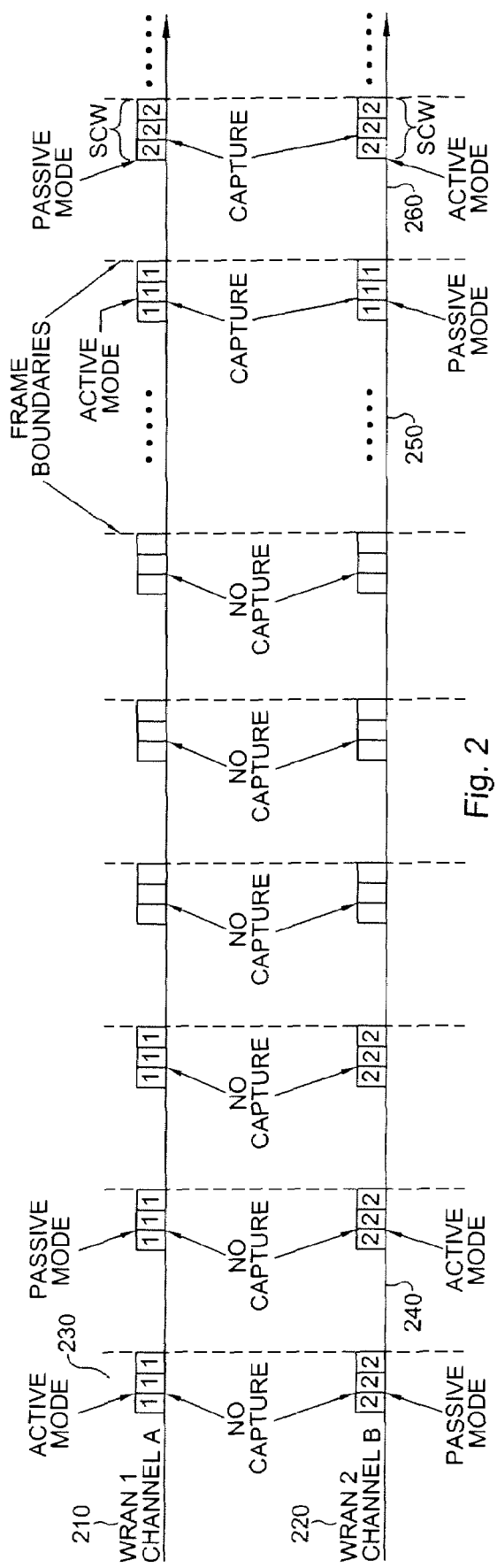
FIG. 2 shows a typical frame sequence of two WRAN cells operating on different channels using CBP as is known in the prior art.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

A SCW reservation protocol for scheduling active and passive modes of CBP packets is herein described by way of example. According to one embodiment of the present invention, each WRAN cell operating on the same channel reserves a sequence of SCWs not occupied by any other WRAN cell operating on that channel. By acquiring a unique period during which a WRAN cell can transmit, collisions from simultaneous transmissions of WRAN cells are eliminated.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

According to one embodiment of the present invention, SCWs for a particular WRAN cell are allocated periodically in deterministic instances. For example every 4, 8 or 16 frames, each WRAN cell operating on the same channel reserves a particular period (frame) during which it is assured that only that cell is transmitting and all other cells are passive, i.e. receiving. Consequently, all of the WRAN cells operating on a channel make their reservation SCWs with the duration of one CBP period. This period of reservation is repeated periodically and is updated based on cells leaving a particular channel or additional cells being added to the channel. The periodic repeating of SCW reservations is referred to herein as a CBP frame.

Figure 3:
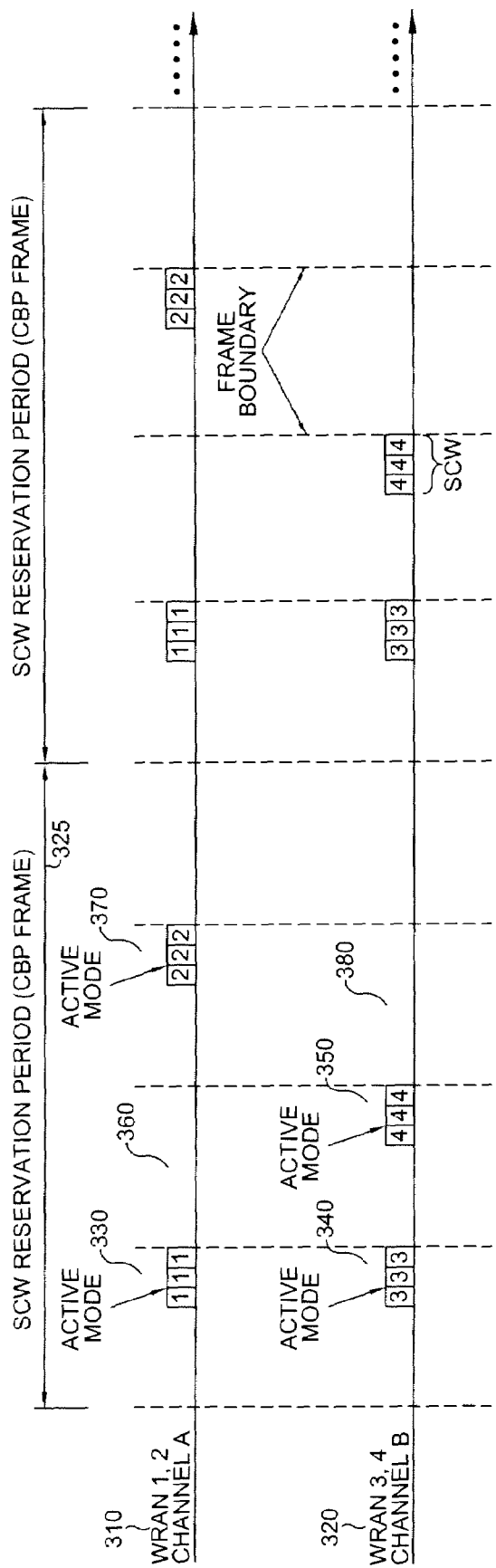
FIG. 3 shows a SCW reservation period as applied to WRAN cells operating on two channels, according to one embodiment of the present invention.

FIG. 3 shows a SCW reservation period as applied to WRAN cells operating on two channels, according to one embodiment of the present invention. As shown in this example, WRANs 1 and 2 operate on channel A 310 while WRANs 3 and 4 operate on channel B 320. During the SCW reservation period (the CBP frame) 325 each WRAN cell has a specific period during which it will transmit. FIG. 3 shows the CBP frame as consisting of four frames in which WRAN 1 uniquely occupies the first frame of channel A 330 and WRAN 3 occupies the first frame of channel B 340. (Note that this example does not depict cross channel communication)

For channel A the next frame 360 is absent of any reservations indicating that WRAN 1 and WRAN 2 are both in a passive mode. At the same time WRAN 4 350 is actively transmitting. In frame 3 WRAN 2 begins an active transmission 370 while WRANs, 1, 3, and 4 remain passive 380. All WRANs are passive in the last frame of the CBP frame. Thereafter the CBP frame repeats such that in every first frame of the CBP frame for channel A 310 WRAN 1 will transmit and for every third frame of channel A, WRAN2 will transmit. Likewise the CBP pattern for channel B 320 is that WRAN 3 transmits on the first frame and WRAN 4 on the second frame. This schedule of transmission can be made known so that any other WRAN cell or CPE expecting data from a particular WRAN will know when that transmission will take place.

Figure 4:
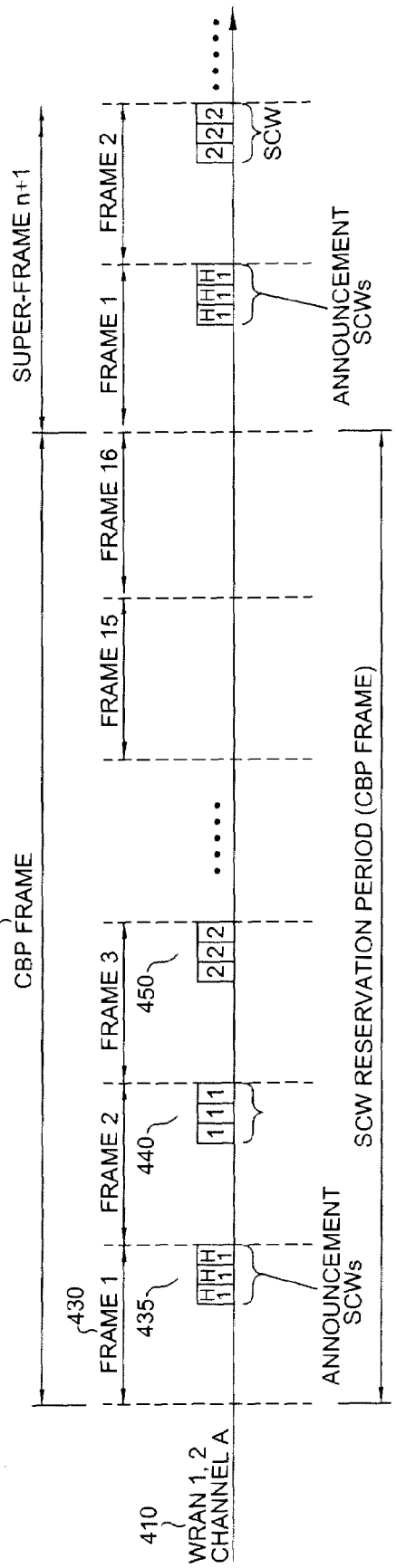
FIG. 4 shows a SCW reservation period as announced by a hosting SCW and as applied to a plurality of WRAN cells, according to one embodiment of the present invention.

FIG. 4 shows CBP framing using announced SCW reservation periods according to one embodiment of the present invention. In this example of the present invention, channel A 410 is the host of WRAN 1 and WRAN 2. Over a CBP period 420 of 16 frames, a schedule is communicated as to when WRAN 1 and WRAN 2 will communicate. This information is established during the initial frame 430 in what is referred to as an announcement or host SCW 435. Here, the announcement communicates that WRAN 1 will transmit on frame 2 440 and WRAN 2 will transmit on frame 3 450. The announcement also includes that the length of the CBP frame is 16 frames so that other WRANs looking for data from either WRAN 1 or WRAN 2 will be able to determine when to expect the data.

The embodiment shown in FIG. 4 illustrates the scalability of the present invention. Using a CBP period of 16 frames, up to 15 WRAN cells could operate on a single channel without experiencing any transmission collisions. While latency must be addressed as the number of WRAN cells on a particular channel grows, the possibility of a contention free environment is very advantageous. In addition, using a CBP period of 16 frames, several frames can remain as contention based. Thus a mixture of reserved frames for exclusive WRAN transmission can exist side-by-side with a number of contention, or best effort, frames. Furthermore, while the CBP period remains at 16 or some other number, the number of SCW reservation periods within that CBP frame can be more than one. Thus, depending on the needs, WRAN 1 could have three reserved frames and WRAN 2 could have two reserved frames, leaving ten remaining frames as contention based.

Figure 5:
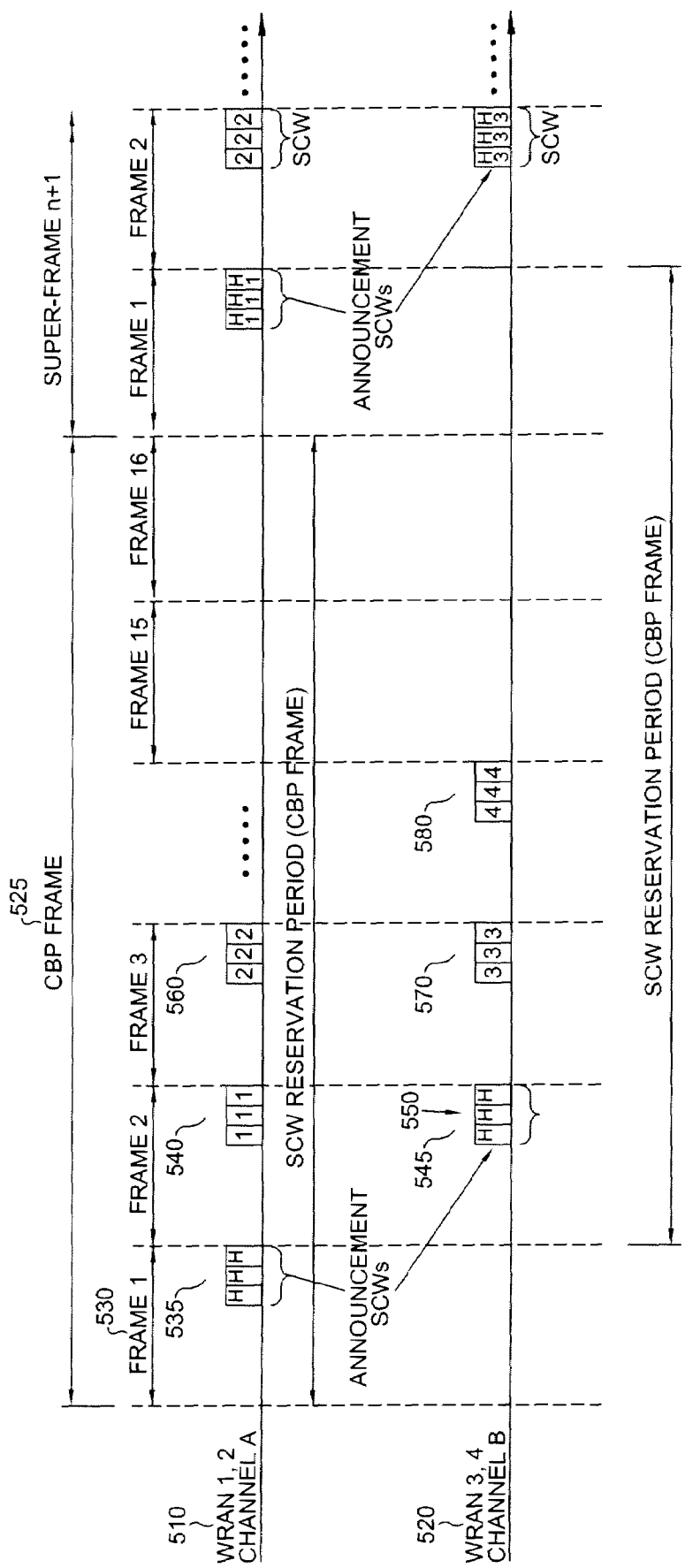
FIG. 5 shows an application of multiple SCW reservation periods as announced by hosting periods for two channels and a plurality of WRAN cells according to one embodiment of the present invention.

FIG. 5 shows a continuation of the CBP framing using announced SCW reservation periods first discussed with reference to FIG. 4. In FIG. 5 two channels are shown, channel A 510 and channel B 520. Two WRANs operate on each channel. As discussed above, the first frame of the CBP frame 525 for channel A 510 is an announcement of reservation periods for that particular channel. Accordingly, the host announcement 535 in the first frame 530 is followed by an exclusive transmission period for WRAN 1 in frame 2 540 and an exclusive transmission period for WRAN 2 in frame 3 560.

To ensure that the reservation schedule of channel A is known to other WRANs operating on different channels, the announcement frames are offset. Thus for channel B the announcement SCW 550 is set for the second frame 545. During the first frame, channel B is in a passive mode receiving the schedule of channel A. Thereafter channel B announces its schedule for WRAN 3 transmitting on frame 3 570 and WRAN 4 transmitting on frame 4 580.

According to another embodiment of the present invention, the hosting or announcement SCW is always placed at the beginning of the CBP frame. To accommodate multiple channels, the CBP frames are offset so as to ensure that WRAN cells on other channels can receive the scheduling information. In addition, each reserved frame for transmission of data includes a life time. At the expiration of the life time, according to one embodiment of the present invention, the reservation is deleted and the frame reverts to a best effort, contention based frame.

Figure 6:
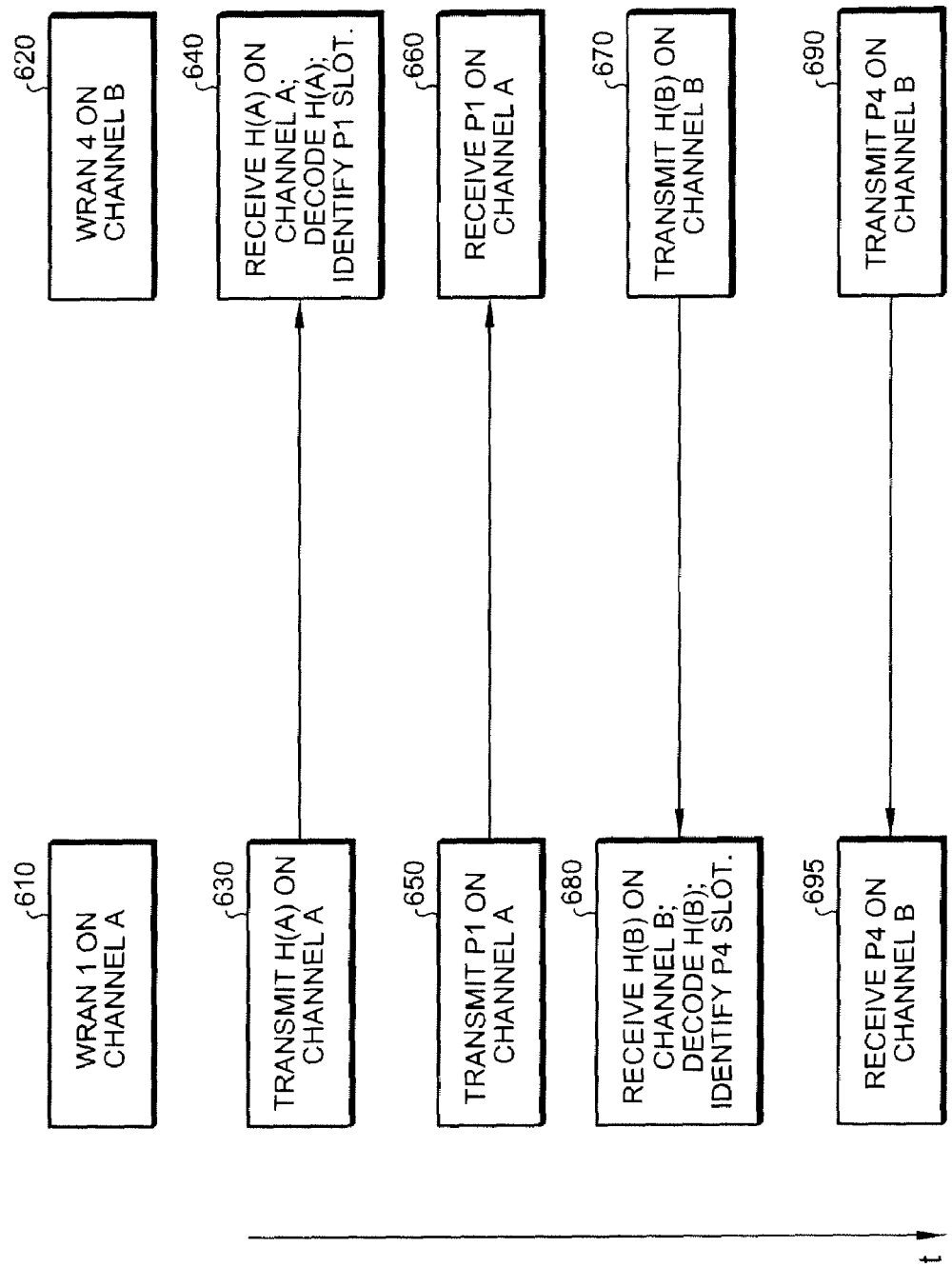
FIG. 6 shows a flowchart for cross-channel inter-cell communication using SCW reservation periods according to one embodiment of the present invention.

FIG. 6 is a flowchart illustrating methods of implementing an exemplary process for cross channel inter-cell communication using SCW reservations over a CBP period. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

FIG. 6 illustrates the steps for cross channel communication using SCW reservations. Consider the scenario when WRAN 1 operates on channel A 610 and WRAN 4 operates on channel B 620. As previously discussed, during the first frame of the CBP frame associated with channel A an announcement H(A) is transmitted 630. The announcement is received by WRAN cells associated with channel A and decoded 640 identifying during what slot WRAN 1 (or other WRANs associated with channel A) will transmit. This information is also received by WRAN cells on channel B. Thereafter WRAN 1 transmits 650 on the designated frame and the data is received on channel A 660. Note that for WRAN 4 to receive the data from WRAN 1, it must tune to channel A. Thus it is to WRAN 4's advantage to know when WRAN 1 will transmit so as to minimize the time it must monitor channel A.

Similarly, channel B 620 announces H(B) on channel B its schedule of WRAN reservations 670. This data is received by WRAN cells associated with channel B 610 and the schedule is decoded to identify to all WRAN cells when during the CBP frame, WRAN 4 will transmit on channel B. Thereafter WRAN 1 tunes to channel B along with other WRAN cells operating on channel B to receive data 695 transmitted by WRAN 4 690. As one skilled in the art will recognize, this simple example can be scaled to accommodate a plurality of WRAN cells operating on a plurality of channels.

The present invention provides reliable, collision free CBP communications via the utilization of efficient announcement of SCW reservations. Efficient and flexible management of CBP communications enables conflict-free SCW reservations and a mixture of different SCW operations. The present invention is scalable and accommodating to a variety of SCW patterns.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

While there have been described above the principles of the present invention in conjunction with SCW reservation and CBP framing, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A self-coexistence window reservation protocol method for a Wireless Regional Area Network (WRAN) including a plurality of WRAN cells operating on a plurality of channels, the method comprising allocating a reservation sequence of self-coexistence windows for each of the plurality of WRAN cells operating on at least one of the plurality of channels identifying a unique transmission frame for each of the plurality of WRAN cells,
wherein the reservation sequence includes a hosting sequence identifying for each of the plurality of WRAN cells operating on each of the plurality of channels an exclusive frame for transmitting data,
wherein the hosting sequence identifies a Coexistence Beaconing Protocol (CBP) frame,
wherein the CBP frame includes a plurality of frames and wherein each frame includes self-coexistence windows and data, and
wherein the hosting sequence is associated with the first of the plurality of frames in the CBP frame.

2. The protocol of claim 1, wherein the self-coexistence window is allocated periodically in deterministic instances.

3. The protocol of claim 1, wherein each WRAN cell operating on a same channel reserves a period that only the cell is transmitting and all other cells are passive.

4. A method for scheduling collision free communication between a plurality of Wireless Regional Area Network (WRAN) cells operating among a plurality of channels in a WRAN, the method comprising:
transmitting on a first channel of the plurality of channels a self-coexistence window (SCW) wherein the SCW includes a first channel WRAN cell transmission schedule for exclusive transmissions by each WRAN cell associated with the first channel;
receiving at each WRAN cell associated with the first channel the first channel WRAN cell transmission schedule for exclusive transmissions; and
transmitting by each WRAN cell associated with the first channel according to the first channel WRAN cell transmission schedule for exclusive transmissions.

5. The method of claim 4 further comprising, responsive to receiving the first channel WRAN cell transmission schedule for exclusive transmissions, transmitting on a second channel of the plurality of channels a SCW wherein the SCW includes a second channel WRAN cell transmission schedule for exclusive transmissions by each WRAN cell associated with the second channel;
receiving at each WRAN cell associated with the second channel the second channel WRAN cell transmission schedule for exclusive transmissions; and
transmitting by each WRAN cell associated with the second channel according to the second channel WRAN cell transmission schedule for exclusive transmissions.

6. The method of claim 5 wherein the SCW that includes the first channel WRAN cell transmission schedule and the SCW that includes the second channel WRAN cell transmission schedule are transmitted during different frames.

7. The method of claim 5 wherein the SCW that includes the first channel WRAN cell transmission schedule and the SCW that includes the second channel WRAN cell transmission schedule each identify a number of frames in a Coexistence Beaconing Protocol (CBP) frame for the first and second channel respectively.

8. The method of claim 7 wherein each CBP frame includes frames of exclusive WRAN cell transmission and contention based frames.

9. The method of claim 7, wherein the CBP is 16 frames.

10. The method of claim 9, wherein up to 15 WRAN cells could operate on a channel without collisions.

11. A wireless system for collision free inter-cell communication in a Wireless Regional Area Network (WRAN), the system comprising:
a plurality of base stations for a plurality of WRAN cells communicating on a communication channel, wherein
a plurality of frames is associated with the communication channel wherein each frame includes data and a self-coexistence window (SCW) and wherein the SCW of at least one of the plurality of frames defines a WRAN cell transmission schedule identifying exclusive transmission frames from among the plurality of frames during which each WRAN cell associated with the communication channel transmits data exclusively on the communication channel.

12. The wireless system of claim 11 wherein the at least one SCW identifies a Coexistence Beaconing Protocol (CBP) set of frames from the plurality of frames.

13. The wireless system of claim 12 wherein the WRAN cell transmission schedule reoccurs during each CBP set of frames.

14. The wireless system of claim 12 wherein the first frame of the CBP set of frames includes the SCW defining the WRAN cell transmission schedule.

15. The wireless system of claim 11 wherein the communication channel is a first communication of a plurality of communication channels and wherein each communication channel is associated with a WRAN cell transmission schedule identifying exclusive transmission frames during which each WRAN cell associated with that communication channel transmits data collision free.

16. The wireless system of claim 11, wherein a hosting or announcement SCW is placed at a beginning of a CBP frame of the set of CBP frames.

* * * * *